United States Patent [19]

Fallon

[11] 4,305,421
[45] * Dec. 15, 1981

[54] FLUID DISPENSING SYSTEM

[75] Inventor: Merton R. Fallon, Thousand Oaks, Calif.

[73] Assignee: Draft Systems, Inc., Northridge, Calif.

[*] Notice: The portion of the term of this patent subsequent to Jan. 1, 1997, has been disclaimed.

[21] Appl. No.: 3,030

[22] Filed: Jan. 12, 1979

Related U.S. Application Data

[63] Continuation-in-part of Ser. No. 837,450, Sep. 28, 1977, Pat. No. 4,181,143.

[51] Int. Cl.³ .................. F16K 51/00; F16K 35/00; F16L 37/00
[52] U.S. Cl. .................. 137/322; 137/212; 222/400.7; 251/90; 251/104; 251/99; 251/110; 220/316; 220/319; 285/360
[58] Field of Search ............. 137/212, 320, 321, 322; 251/149.6, 149.9, 231, 214, 90, 99, 104, 110; 222/400.7, 400.8; 285/360, 376, 401; 277/188 R, 217; 220/316, 319, 375

[56] References Cited

U.S. PATENT DOCUMENTS

| | | | |
|---|---|---|---|
| 655,672 | 8/1900 | Engel | 137/212 |
| 784,513 | 3/1905 | Brockelbank | 285/376 |
| 850,410 | 4/1907 | Weatherhead | 285/376 |
| 1,708,395 | 4/1929 | Muller | 251/104 |
| 1,758,727 | 5/1930 | Wildin | 251/104 |
| 2,250,199 | 7/1941 | Kelly | 285/376 |
| 2,657,007 | 10/1953 | Ganz | 251/90 |
| 2,836,443 | 5/1958 | Farmer | 277/188 R |
| 3,086,749 | 4/1963 | Frye | 251/214 |
| 3,353,724 | 11/1967 | Johnston | 137/322 |
| 3,473,556 | 10/1969 | Johnson et al. | 137/322 |
| 3,596,810 | 8/1971 | Taubenheim | 137/212 |
| 3,602,340 | 8/1971 | Budzich et al. | 251/214 |
| 3,672,390 | 6/1972 | Gravesteijn | 137/212 |
| 3,937,246 | 2/1976 | Schots | 137/322 |
| 4,125,209 | 11/1978 | Bailey | 222/400.7 |

FOREIGN PATENT DOCUMENTS

| | | | |
|---|---|---|---|
| 255921 | 12/1964 | Australia | 285/376 |
| 709248 | 5/1965 | Canada | 222/400.7 |
| 709717 | 5/1965 | Canada | 222/400.7 |
| 709718 | 5/1965 | Canada | |
| 2130033 | 1/1972 | Fed. Rep. of Germany | |
| 1632052 | 6/1973 | Fed. Rep. of Germany | |
| 2639918 | 3/1978 | Fed. Rep. of Germany | 137/322 |
| 254542 | 11/1926 | Italy | 251/104 |
| 930015 | 7/1963 | United Kingdom | 137/322 |
| 1003447 | 9/1965 | United Kingdom | |
| 1105615 | 3/1968 | United Kingdom | |
| 894996 | 4/1972 | United Kingdom | |
| 1291619 | 10/1972 | United Kingdom | |
| 1382735 | 2/1975 | United Kingdom | |
| 1402631 | 8/1975 | United Kingdom | 137/322 |
| 1416781 | 12/1975 | United Kingdom | |
| 1553680 | 10/1979 | United Kingdom | |

*Primary Examiner*—Martin P. Schwadron
*Assistant Examiner*—G. L. Walton
*Attorney, Agent, or Firm*—LeBlanc, Nolan, Shur & Nies

[57] ABSTRACT

A system for dispensing fluid from a container. The container is pressurized by supplying gas into the container thereby forcing the fluid out of the container through a siphon tube and an outlet valve in the container. The system utilizes a valve assembly having two valves, one for enabling the flow of the gas into the container and the second for allowing the flow of the fluid out of the container. The valve assembly is mounted in a neck member that is secured to an opening in one of the walls of the container. Arranged within the neck is a deformable seal that is compressed between a body portion of the valve assembly and an inner surface of the neck member. A non-threaded retaining ring holds the valve body portion of the valve assembly within the neck member and serves to apply the force to the valve body portion for compressing the seal. In order to avoid the existence of a sump within the valve structure, which could damage or contaminate the fluid dispensed from the container, the top of the valve assembly is substantially flush with the top of the neck member. A coupler is connected to the neck member and has a probe capable of being moved between an open position and a closed position. In its open position, the probe serves to open the two valves of the valve assembly for enabling gas to be fed into the container and fluid to be dispensed from the container.

49 Claims, 9 Drawing Figures

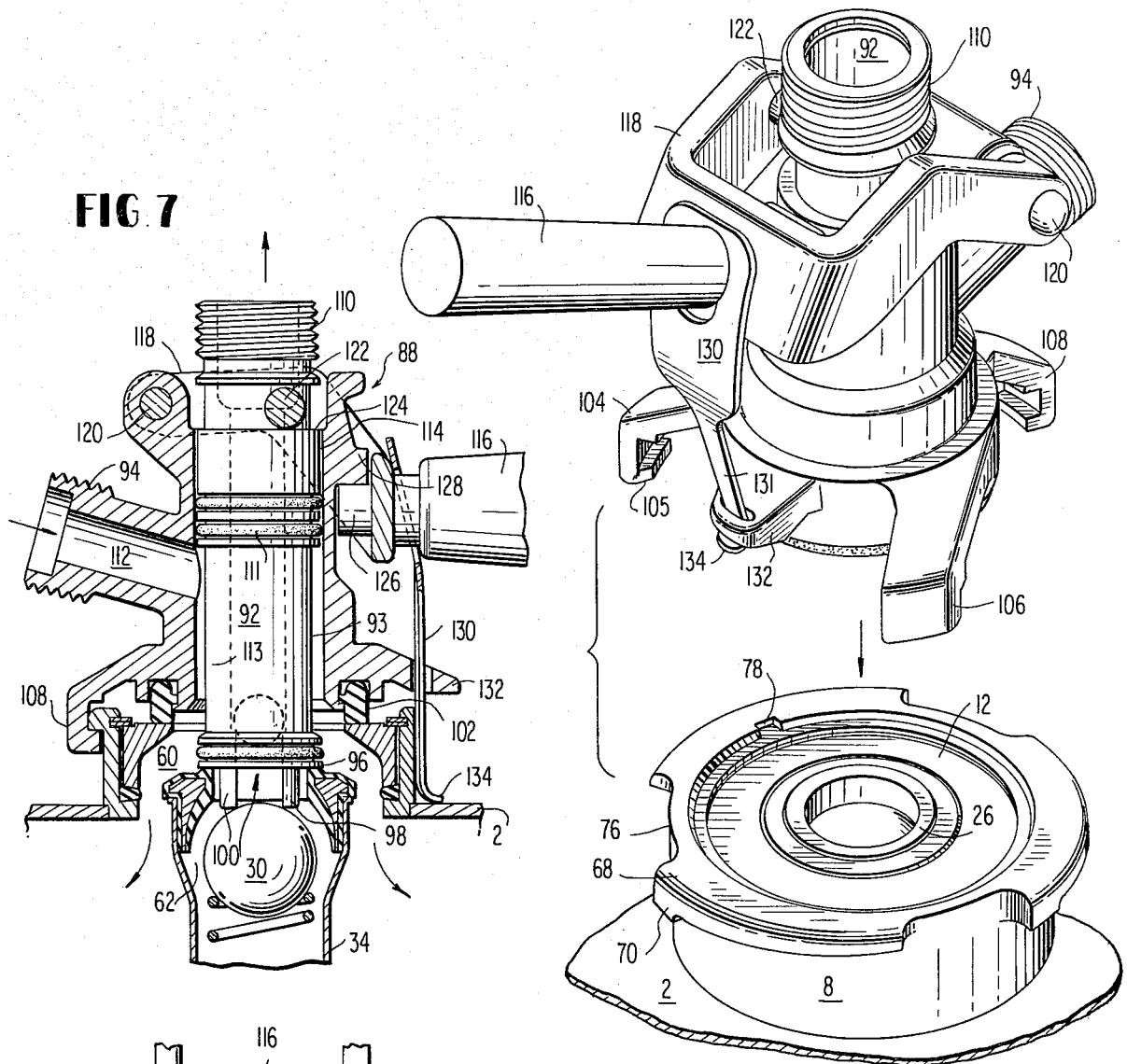
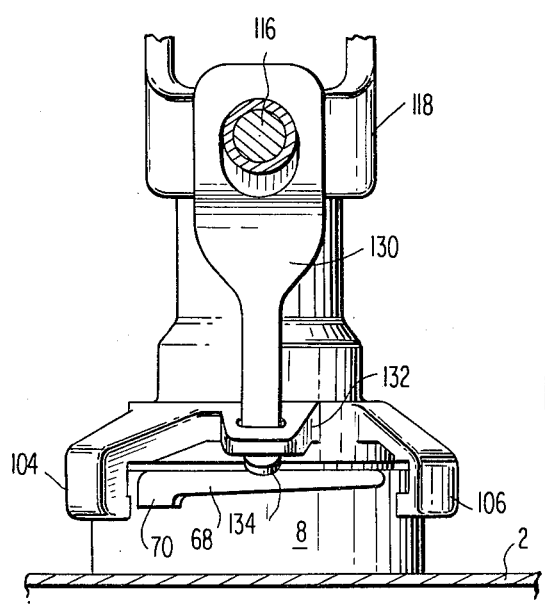

FLUID DISPENSING SYSTEM

RELATED APPLICATIONS

The present application is a continuation-in-part of application Ser. No. 837,450, filed Sept. 28, 1977, which application is herein incorporated by reference, which is now U.S. Pat. No. 4,181,143. The present application also relates to application Ser. No. 837,449, filed Sept. 28, 1977, now U.S. Pat. No. 4,159,102. Both of these applications are assigned to the same assignee as the present application.

BACKGROUND OF THE INVENTION

The present invention relates to a system for dispensing fluid from a container, in particular beer kegs.

In systems for dispensing pressurized fluid from a container, such as beer from a keg, a valve assembly is secured in the top of the container for providing access to the fluid. This valve assembly is mounted in a receiving member, generally referred to as a neck, that is secured within the only opening in the container. The valve assembly generally includes a dual valve arrangement with a siphon tube extending from the valve assembly to the bottom of the container. In operation, a gas is forced into the container through one of the valves in the valve assembly and the fluid within the container travels up through the siphon tube and out of the second valve of the valve assembly.

When employing such a fluid container, the container is formed with the neck and valve assembly mounted therein. The container is then filled with fluid and transported to the site at which the fluid is to be dispensed, such as at a tavern when the container is a beer keg. At the dispensing location, a coupler is connected to the neck. A pressure source, such as a pressurized gas is fed into one opening in the coupler and down through the first valve into the container. As the container is pressurized the fluid passes through the siphon tube and out of the second valve where it then travels through the coupler to the fluid dispensing mechanism, by a beer tap. Typically, the pressurized gas employed in such a system is carbon dioxide.

In order for such a system to work, it is mandatory that an effective seal be provided to prevent the pressurized gas being fed into the container from escaping through the neck member. For this purpose, an elastomeric O-ring is mounted in sealing engagement between the neck and a valve body portion of the valve assembly. This O-ring prevents leakage through the interface between the valve assembly and the neck. In order to achieve this seal, the O-ring is compressed between the metal shoulders of the valve body portion and the neck member. Prior to the development of the present invention and those inventions disclosed in the above-noted patent applications, the metal shoulders of the valve body portion and the neck were moved toward each other for compressing the O-ring by a threaded engagement between the valve body portion and the neck member. More specifically, the valve body portion was positioned within the neck member and rotated therein so that by additional rotation more thrust was applied against the seal since the two metal shoulders were forced closer together. The use of such a connection was apparently done on the premise that under such a force the seal continues to be compressed. However, there is a limitation as to how far the seal can be compressed without causing damage to the seal, since most elastomeric seals have a maximum compression capability of something less than ten percent of the compressed dimension. Generally, the greater the compressability, the greater the tendency of the seal to take a compression set. In other words, if an elastomeric material that has a compression limit of ten percent and is compressed from a one inch dimension to 0.9 inches and held there in that compressed mode for a sustained period of time, such a seal will not return to its original one inch dimension. Instead, such a seal might return to a new uncompressed dimension of 0.92 inches. In order to compensate for this problem, those neck and valve assemblies previously known typically allowed for an additional thrust to be created by additional rotation of the members relative to each other. Thus a very broad variation in the metal-to-metal surface dimension clearance existed since the members were merely threaded or unthreaded so as to reduce or increase the lineal dimension between the sealing surfaces.

The problem with such an approach, however, is that there is no effective way to limit the compressional forces applied to the elastomeric O-ring. Without such a limitation, the sealing ring is often overcompressed thereby subjecting it to compression set in which case it will not return to its original uncompressed state when the lineal thrust is reduced. Over a long period of time, this creates a tendency for the O-ring to lose its sealing characteristics. In addition, the O-ring can be damaged by the action of the metal shoulders rotating against the surface of the ring thereby destroying its sealing properties.

In addition to the possible loss in the efficacy of the seal, due to overcompression or damage caused by the rotation of the two metal parts, there are other substantial drawbacks to the employment of such a threaded connection. During utilization of the dispensing system, the threaded members can be loosened thereby causing the seal to be inadvertently violated. This possibility is especially significant since the coupler is typically attached to the neck member on the container by a rotational movement. Thus, the screwing and unscrewing of the coupler to the neck member can cause the threaded members to be unscrewed thereby relieving the lineal thrust applied to the O-ring and violating the seal.

The valves of the valve assembly are normally biased into their closed positions. The forces for biasing such valves are created by heavy-duty, helical springs. The creation of such forces for closing the valves leads to an additional problem when utilizing a threaded connection between the valve body portion and the neck member for holding the valves within the container. As previously mentioned, it is possible for this threaded connection to become unscrewed. If either inadvertently or by someone tampering with the dispensing system, the valve body portion that was threaded into the neck member for compressing the seal is completely unscrewed from the neck member, the force created by the springs for closing the valves will act in effect as a propulsion mechanism. Thus, if the valve body portion is accidently or through improper tampering unscrewed from the neck, without the proper precautions being taken, the valve assembly is turned into a projectile by the forces created by the springs, which can cause serious injury and possibly even death to a person standing next to the container.

Most valve assemblies used with pressurized fluid containers have included a dual valve system having two valve members, each being biased into engagement with its respective valve seat, as briefly referred to above. Typically, the helical spring for biasing at least one of the valve members circumscribes the siphon tube being utilized. A spring retaining cup is employed to hold the helical spring in place with sufficient compression to maintain the valve in a normally closed position. The cup extends downwardly from the valve body about the helical spring and has a radially projecting surface extending inwardly toward the siphon tube to support the bottom of the spring. When utilizing the helical spring in such a manner, it becomes difficult to clean and allows residue to build up in the spring coils. Because the cleaning fluids are injected under pressure through the valves, the location of the helical spring adjacent the siphon tube is one which is not readily accessible to the path taken by the pressurized cleaning fluid. In addition, the coils of the spring are not sufficiently exposed so as to receive the full effect of the cleaning fluid. The build up of residue in this area can adversely affect the quality of fluid within a container.

The build up of residue also can occur in many other locations where there are exposed crevices on the outside of the container or where there are portions inside the container that are not capable of being properly cleaned. One such possible area on the outside of the container is the recess normally provided in the neck between the top of the neck and the top of the valve assembly. This recess is typically provided in order to enable a coupler to be secured to the interior of the neck and to extend down into the neck when connected to the container.

While in the specific embodiments described herein reference is made to the container being a keg and the fluid therein being beer, the container can be used for other fluids. For example, the container can be utilized for agricultural chemicals such as pesticides, insecticides, fertilizer, etc.

SUMMARY OF THE INVENTION

An object of the present invention is to provide an improved sealing relationship between a valve assembly and a neck member mounted within a container.

Another object of the present invention is to provide a fluid container having mounted in one of its walls a valve assembly receiving neck and a valve assembly secured within such neck, where an improved seal is provided between the valve assembly and the neck.

A further object of the present invention is to provide a fluid dispensing system having a container with a valve assembly receiving neck mounted in one of its walls, a valve assembly arranged within the neck, and a coupler secured to the neck for enabling fluid to be dispensed from the container, where the valve assembly is securely fastened within the neck without the use of any threaded member.

Still another object of the present invention is to provide an improved valve assembly and receiving neck arrangement.

A still further object of the present invention is to provide an improved coupler to be coupled to a valve assembly receiving neck mounted within a container.

Another object of the present invention is to provide a mechanism for securely holding a valve assembly within a receiving neck of a fluid container that avoids the drawbacks of previously known systems.

A further object of the present invention is to provide a valve assembly mounted within a receiving neck which eliminates the dangers inherent in previously known arrangements.

Still another object of the present invention is to provide a container having a receiving neck mounted within one of its walls with a valve assembly secured within such neck in such a manner so as to avoid the drawbacks of previously known systems.

The above objectives can be achieved by providing a fluid dispensing system employing a valve assembly arrangement and corresponding coupler in accordance with the present invention. In particular, the valve assembly arrangement provides for two valves to be secured within a neck member that is mounted within a container where the arrangement has an internal seal that is compressed so as to form a secure seal between the valve body portion of the valve and the neck member without employing any threaded device. In addition, in order to avoid any sump effect or build up of residue that can contaminate and spoil the fluid being dispensed from the container, the valve body portion of the valve assembly is arranged within the neck in such a manner so that its top is substantially flush with the top of the neck. An appropriate coupler is provided which can be attached to the neck in spite of the fact that the top of the neck and valve assembly arrangement are substantially flush. This coupler includes a probe which when pressed into its open position opens the two valves of the valve assembly.

With respect to the sealing characteristics of the arrangement of the present invention, the arrangement provides for the creation of a lineal thrust against a deformable sealing member that is positioned between the surfaces of the valve body portion and the neck so that this seal is appropriately compressed without relying upon any rotational forces. This allows for better tolerances between the parts which help to maintain the seal for longer periods of time and to avoid inadvertent violation of the seal due to operation of the valve arrangement when engaging and disengaging the coupler from the container. Moreover, compression set is avoided since the tolerances can be maintained and controlled by the use of a non-rotational system. In addition, the system is one which is easy to install and provides a substantially safe connection thereby rendering the entire fluid dispensing system superior to those systems previously utilized.

More specifically, in accordance with the preferred embodiment of the present invention, the neck is mounted within the top wall of a container and the valve assembly is secured within the neck with a seal provided between mating surfaces of the inner surface of the neck and a valve body portion of the valve assembly. In order to compress the seal, the valve body portion is held in place by a retaining ring positioned within a groove on the inner surface of the neck at the top of the neck. This ring provides a sufficient force for causing the valve body portion to compress the seal against a seal engaging surface of the neck. The top of the valve body portion and the neck are substantially flush so that there is no cavity in the top of this arrangement, thereby avoiding any sump effect and build up of residue capable of contaminating the fluid. Inasmuch as there is no cavity, the type of coupler typically utilized in accordance with previously known systems where the coupler has connecting members extending into the neck and is secured to the interior of the neck cannot be employed. Instead, in accordance with the present invention, a coupler is provided which has a plurality of engaging arms that grip flanges that circumferentially extend around the peripheral surface of the neck.

As an added safety device, a keyway locking mechanism is provided in the arrangement of the valve assembly and neck member. For this purpose, an offset keyway is defined within the groove formed in the inner surface of the neck. This keyway cooperates with a boss or key on the valve body portion of the valve assembly. This allows for the insertion of the valve body into the neck and retention therein even when the retaining ring that is mounted within the groove is withdrawn. The keyway has two recessed portions, one extending downwardly through a lower lip in the groove and the other extending upwardly from the upper lip of the groove. Both portions are offset vertically and circumferentially from each other. In this manner, to locate the valve body within the neck, the key is registered within the first recessed area and moved downwardly. The valve body portion with the key is then rotated until the key registers with the second recessed area and the valve body portion is then moved further downwardly until the groove is exposed for enabling the retaining ring to be placed therein. With this configuration, should the retaining ring be inadvertently dislodged while the container is under pressure, the key will engage an upper lip of the groove above the second recessed area thereby preventing the valve body and the valve assembly from being forcibly expelled from the container. This locking mechanism further serves as a safety device to prevent injury to those persons who may tamper with the valve system when the container is under pressure.

As more fully described in the preferred embodiment, the valve assembly includes a dual valve system with each valve member being biased into a closed position with its respective valve seat. The valve assembly is connected to a siphon tube that extends down from the valve assembly to a location adjacent to the bottom of the container. The siphon tube carries at least one of the valve members at its upper end. A helical spring is secured to the bottom portion of the siphon tube. This helical spring is arranged within the interior of the siphon tube and extends to the bottom of the container. The spring is maintained in compression between the siphon tube and the bottom of the container in order to bias the tube and ultimately the valve member against its respective seat. The seat for the first valve member is formed by the valve body portion that is mounted within the neck. The location of the spring in this manner insures that cleaning fluid forced through the tube will completely wash the coils of the spring so as to prevent accumulation of residue. In addition, the bottom of the siphon tube is flared so as to prevent occlusion of the tube should it be extended flush with the bottom surface of the container. The flared tube also defines a flow path from the siphon tube which enhances flow distribution of fluid through the container for cleaning purposes.

The coupler that is attached to the neck includes a probe for actuating the valves in the valve assembly. The actuating mechanism of the coupler includes a handle which is movable between an open position where the probe is extended for opening the valve and a closed position where the probe is retracted thereby allowing the valves to revert to their normally closed position. A locking mechanism is incorporated with the coupler for preventing attachment or disengagement of the coupler with the valve assembly whenever the handle and hence the probe are in their open position, thereby insuring that the valves are never opened until the coupler is fully secured in place. Absent such a locking mechanism, it would be possible for the coupler to be attached to the neck member when the probe was in its extended position for opening the valves. If engagement of the coupler to the valve assembly was allowed to occur when the probe was extended, the seals within the systems would be violated while the valves were still open thereby causing the fluid from the container to spurt forth out of the dispensing system. In addition to the loss of fluid and possible damage caused thereby, this also could cause contamination or damage to the fluid within the container.

BRIEF DESCRIPTION OF THE DRAWINGS

FIG. 6 is a perspective view of the coupler and the upper portion of the neck and valve assembly prior to engagement of the coupler with the neck.

FIG. 7 is a side elevational sectional view of the coupler mounted on the neck of the arrangement illustrated in FIG. 1.

FIG. 8 is a side elevational view of the arrangement illustrated in FIG. 7.

DESCRIPTION OF THE PREFERRED EMBODIMENTS

Figure 1:
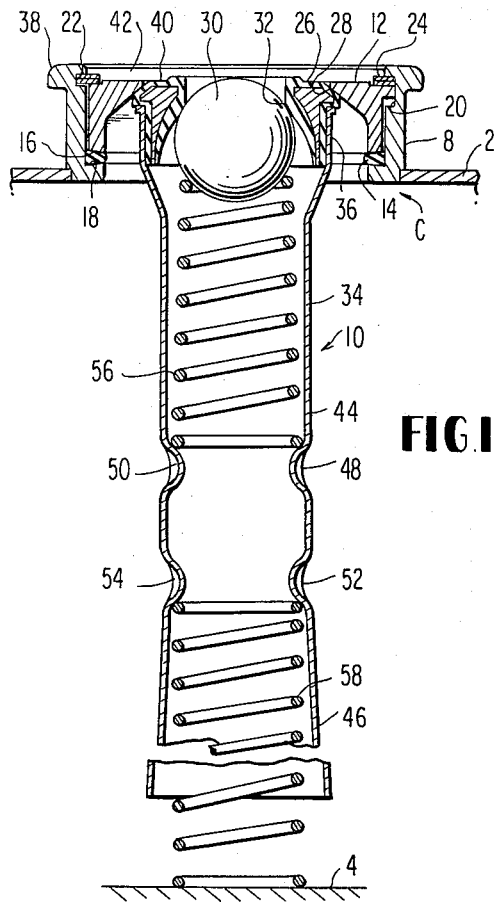
FIG. 1 is a side elevational sectional view of a keg of a dispensing system in accordance with the present invention with the neck and valve assembly mounted therein, with the valves being in their closed position.

As illustrated in FIG. 1, the fluid container to be used in the dispensing system of the present invention has a top wall 2 and a bottom wall 4. Only a portion of this container has been illustrated for the sake of convenience. The illustrated container portions are part of a stainless steel beer keg. Mounted within an opening 6 in top wall 2 is a neck member 8. The bottom edge of neck 8 is welded to wall 2 so as to form a unitary construction. The only opening in the container is that opening in the top of neck 8.

A valve assembly 10 is mounted within neck 8 in the container and extends between neck 8 and bottom wall 4 of the container. In order to insure against leakage of fluid from the container, it is mandatory that the areas of contact between the valve assembly and the neck be appropriately sealed. This is especially important since the container will be pressurized when the fluid is to be dispensed from the container.

In order to provide for an appropriate seal between the valve assembly and the neck, an elastomeric O-ring 14 is provided. This elastomeric ring is compressed between a seal engaging surface of valve body 12 and an engaging surface 18 along the inner bottom surface of neck 8. By exerting a lineal thrust against valve body 12 so as to force it towards the bottom of neck 8, seal 14 is compressed thereby forming an appropriate seal between the two members. Valve body 12 after being forced in a downward direction is held in place by a helical retaining ring 24 that is mounted within a groove 22 along the inner surface 20 of neck 8.

Valve assembly 10 includes two valves. One of the valves serves to form a passage for feeding a gas, such as carbon dioxide, into the container for creating a pressure within the container. A second valve provides a passage for releasing fluid that is forced out of the container by the gas being fed into the container. The first of these two valves, which provides an opening for the gas to be fed into the container, is formed by a valve seat 28 and a valve member 26. Valve seat 28 is a portion of the inner surface of valve body portion 12, which is rigidly secured within neck 8. Valve member 26, however, is mounted on top portion 36 of siphon tube 34. In order to open the valve, valve member 26 is movable in a downward direction along with siphon tube 34 in a manner that will be described in further detail below.

The second valve is formed by a valve seat 32 and a valve member 30. Valve seat 32 is a portion of the inner surface of valve member 26. Valve member 30 is a cylindrical ball that is spring biased in an upward direction within siphon tube 34 so as to be forced against valve seat 32. Both valve members 26 and 30 are spring biased in an upward direction against respective valve seats 28 and 32 so that both valves are normally in a closed position. For this purpose, in accordance with the preferred embodiment of the present invention, the entire siphon tube is biased in an upward direction.

Siphon tube 34 extends from the valve assemblies down to an area adjacent to but slightly spaced from the inner surface of wall 4 of the container. Siphon tube 34 has an upper portion 44, which in turn has top portion 36, which was previously mentioned. The siphon tube also has a lower portion 46. Lower portion 46 of the siphon tube is flared in an outward direction so as to more easily enable fluid from inside of the container to flow up into the siphon tube and to pass through such tube. Mounted within upper portion 44 of the siphon tube is a first spring 56 which biases valve member 30 into its closed position against valve seat 32. Spring 56 is held in such position by depressions 48 and 50 in the side walls of siphon tube 34. The entire siphon tube, on the other hand, is biased in the upper direction by a spring 58 mounted in lower portion 46 of the siphon tube. Spring 58 is held in position by depressions 52 and 54 in the side walls of the siphon tube so as to press against the inner surface of bottom wall 4 of the container. Thus, spring 58 biases the entire siphon tube so as to close the first valve formed by valve seat 28 and valve member 26, while spring 56 biases valve member 30 into its closed position against valve seat 32.

When the valves of the valve assembly are in their closed position, top 40 of the entire assembly is substantially flush with top portion 38 of neck 8. This arrangement substantially minimizes the size of cavity 42. By minimizing the size of cavity 42, any possible sump effect is substantially eliminated. Furthermore, the area where residue can accumulate which would contaminate the fluid is also substantially minimized thereby providing for a far more advantageous system less likely to cause any damage to the fluid. The avoidance of such damage to the fluid is especially critical when the fluid is one for consumption, such as beer. Clearly substantial care must be taken to avoid an inadvertent health risk.

Figure 2:
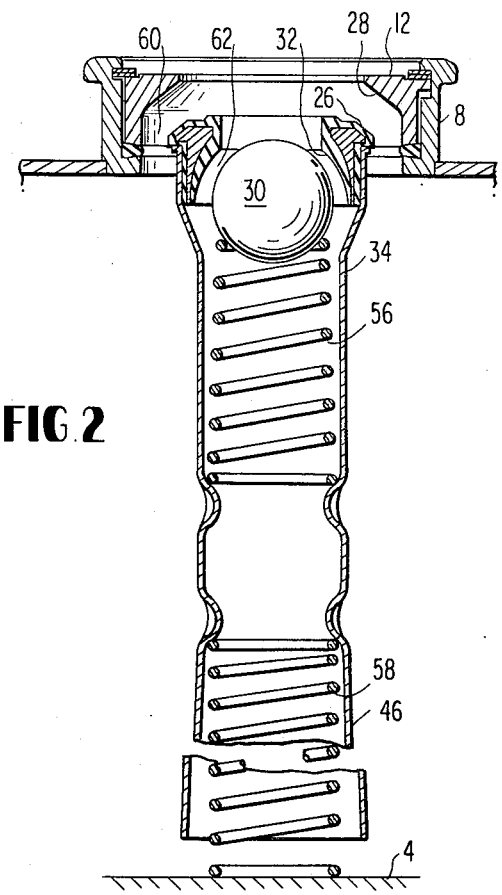
FIG. 2 is a view similar to FIG. 1 with the valves being in their open positions.

While in FIG. 1, the valve assembly is shown with the valves in the closed positions, in FIG. 2 the valves have been forced into their open positions. By pressing siphon tube 34 in a downward direction thereby compressing spring 58, valve member 26 is moved away from valve seat 28. This provides for a first passageway 60 within neck 8. The gas for pressurizing the interior of the container is fed into the container through passageway 60.

The second opening within the valves is provided by depressing valve member 30 so as to compress spring 56. This causes a second passageway 62 to be formed within the top of the siphon tube. Thus, as the gas is fed to the first passageway into the interior of the container, fluid is forced up the siphon tube and out through second passageway 62. By coupling the top of the siphon tube with an appropriate dispensing tube, the fluid can then be carried away from the container to a dispensing spigot, such as for example, a beer tap.

Due to the compressional forces created by spring 58, several safety devices are provided in order to prevent the valve assembly from being dislodged from neck 8. One particular safety device is the provision of a key locking mechanism between neck 8 and valve body portion 12. This key locking mechanism is illustrated in FIGS. 3 and 4.

Figure 3:
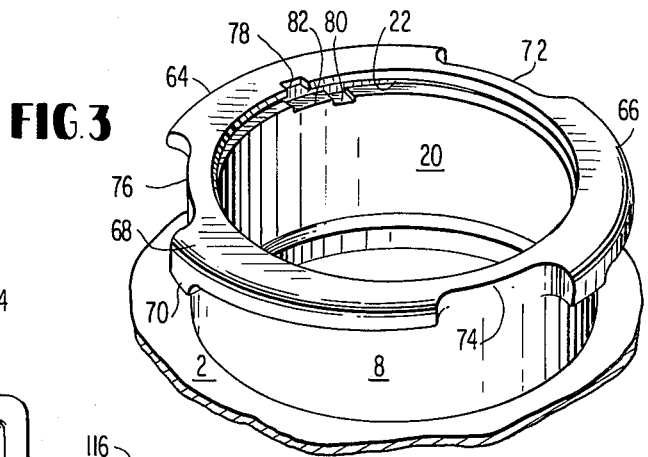
FIG. 3 is a perspective plan view of the neck mounted on the top wall of the keg of the assembly that is illustrated in FIG. 1.
Figure 4:
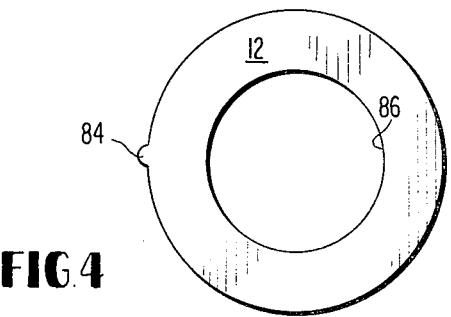
FIG. 4 is a top plan view of the valve body portion of the valve assembly illustrated in FIG. 1.

In FIG. 3, neck member 8 is shown in a perspective view. At the top of inner surface 20 of neck 8 is a groove 22 which receives helical ring 24 for securing valve body portion 12 within the neck. At the top edge of the groove there is a recess 78. Along the bottom edge of the groove, spaced from recess 78 is a second recess 80. Recesses 78 and 80 are interconnected by a slot 82. Recesses 78 and 80 along with slot 82 in effect forms a keyway through which a key can pass.

Valve body portion 12 has an appropriate key 84 extending along a top portion of its outer circumferential surface. When valve body portion 12 is inserted into neck 8, key 84 is first aligned with recess 78. The valve body portion is then pressed in a downward direction and slightly rotated so that key 84 passes along slot 82. The valve body portion is then pressed further downwardly so that key 84 enters recess 80. After valve body portion has been arranged within neck 8 and key 84 is aligned in recess 80, retaining ring 24 is inserted into groove 22 in the top of neck 8.

In order to enable gas to be supplied to the container through passageway 60 and for the fluid to be expelled from the container through passageway 62, a coupler assembly 88 is provided. Coupler assembly 88 once attached can depress both valve member 26 and valve member 30 so as to push both of these members away from their respective valve seats 28 and 32, thereby opening passageways 60 and 62, respectively. Coupler 88 is attached to neck 8 by a bayonet-type mounting mechanism which grips flanges positioned around the external surface of neck 8.

Neck 8 has three spaced flanges 64, 66 and 68 arranged at its upper end. Each of the flanges are separated by an appropriate space 72, 74 and 76. Each flange is wedge shaped so as to provide a cam surface having an angle of approximately $2\frac{1}{2}°$. At the wider end of each of the flanges there is a stop member 70 which limits the rotational movement of the coupler when it is attached to the neck.

Figure 5:
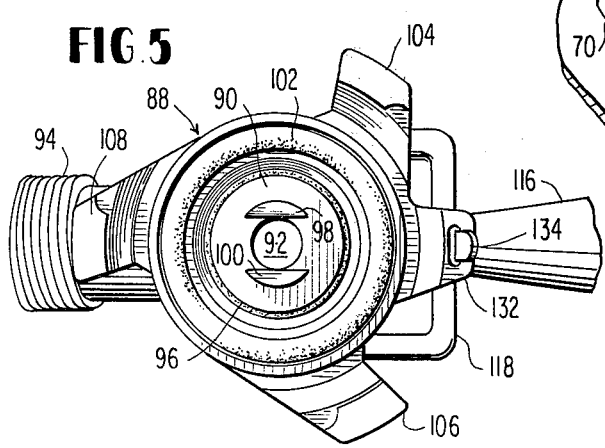
FIG. 5 is a bottom plan view of a coupler assembly to be employed in the fluid dispensing system illustrated in FIG. 1.

Coupler 88 has three gripping arms 104, 106 and 108, as illustrated in FIGS. 5 and 6. Each of the gripping arms has a U-shaped section 105. The spaces between the flanges are wide enough to enable the gripping arms of coupler 88 to pass between the flanges. Once the coupler is seated on top of neck 8, the coupler is then rotated so that arms 104, 106 and 108 engage respective flanges 64, 66 and 68. The coupler is rotated until the arms come in contact with the stop members 70.

Coupler 88 has two fittings 94 and 110 which serve to enable a gas supply line to be connected to the coupler and a fluid dispensing line to also be connected to the coupler. The gas supply line is connected to fitting 94 so that the gas is supplied through a passage 112. This gas flows through the coupler down through an outer cylindrical chamber 113 and into the container through passageway 60. The gas is prevented from passing in an upward direction by a plurality of seals 111 provided in the interior of the coupler and is prevented from escaping from the coupler by seal 102.

Passing through the center of the coupler is an inner cylindrical chamber 92. Chamber 92 is connected between fitting 110 and a probe 90 located at the bottom of the coupler. A second cylindrical chamber 113 surrounds chamber 92. Chambers 92 and 113 are both positioned within a housing 93.

Probe 90 includes two forks 98 and 100 and a sealing ring 96. The two forks are positioned at opposing ends of chamber 92. By forcing housing 93 in a downward direction, ring 96 contacts the upper end of valve member 26 thereby pushing the valve member along with siphon tube 34 in a downward direction and opening passageway 60. Opening of passageway 60 allows the gas supplied through fitting 110 to flow through passage 112, chamber 113 and into the container. Immediately before ring 96 contacts valve member 26 and before passageway 60 begins to open, forks 98 and 100 will contact valve member 30 causing this valve member to be depressed in a downward direction so as to open passageway 62. When passageway 62 opens, fluid from the container flows through chamber 92 and out of fitting 110 to the dispensing tap. The mechanism for moving housing 93 in a downward direction is described below.

A pivotal lever assembly is provided for causing housing 93 to move in a downward direction. The assembly includes a U-shaped lever that is connected on opposite sides of the coupler to a pin 120 that extends through the coupler body. At the opposite end of the lever is a handle 116 that is used for pivoting the lever 118 about pin 120. As the lever moves in a downward direction, actuating pins 122 which are located on opposite sides of housing 93 engages a cam surface 124. As the handle moves the lever in a downward direction, actuating pins 122 apply pressure to cam surface 124 for causing housing 93 to be moved in a downward direction.

Handle 116 has a locking mechanism that prevents it from being moved downwardly so as to pivot lever 118 about pin 120. This locking mechanism includes a locking rod 126 that can be retracted into handle 116. Only by retracting locking rod 126 can handle 116 be moved past locking boss 128 so as to pivot lever 118. In addition, once the lever has been pivoted into its lower position, locking rod 126 assumes a position below locking boss 128 so as to prevent the lever from being moved upwardly until locking rod 126 is again retracted.

A further locking mechanism is provided for preventing the coupler from being attached or disengaged from neck 8 when probe 90 is in its open position. For this purpose, a locking strap 130 is attached to handle 116. Locking strap 130 has an elongated section 131 with a lower locking member 134. Elongated portion 131 extends through a guide member 132 that limits movement of elongated member 131 to a substantially vertical direction.

The operation of this locking device that prevents engagement or disengagement of the coupler from the neck when the probe is opened can be appreciated from the drawings in FIGS. 6 and 8. Presuming that when the coupler is being attached to neck 8 that probe 90 is in the retracted, or closed, position, then when the coupler is attached to the neck as shown in FIG. 8, the locking member will be in an upward position thereby allowing such engagement. Alternatively, if the probe had been extended, or opened, then locking member 134 will be in an extended position and in such position will contact one of the flanges on the neck thereby preventing the coupler from being lowered into a position for engaging the neck. Thus, the coupler only can be attached to the neck when the probe and likewise locking member 134 are in a retracted position.

After the coupler has engaged neck 8, the coupler is prevented from being disengaged when probe 90 is in its extended position due to a locking action provided by locking member 134. When the coupler has been attached so that gripping arms 104, 106 and 108 engage flanges 64, 66 and 68, locking member 134 is extended into its lower position and enters one of the spaces between adjacent flanges on the neck. When locking member 134 is in this lower position, any attempt to rotate the coupler will be prevented since the locking member will contact the flanges, thereby preventing rotation of the coupler. Thus, the coupler cannot be disengaged from the neck until the probe and likewise locking member 134 are retracted.

Figure 9:
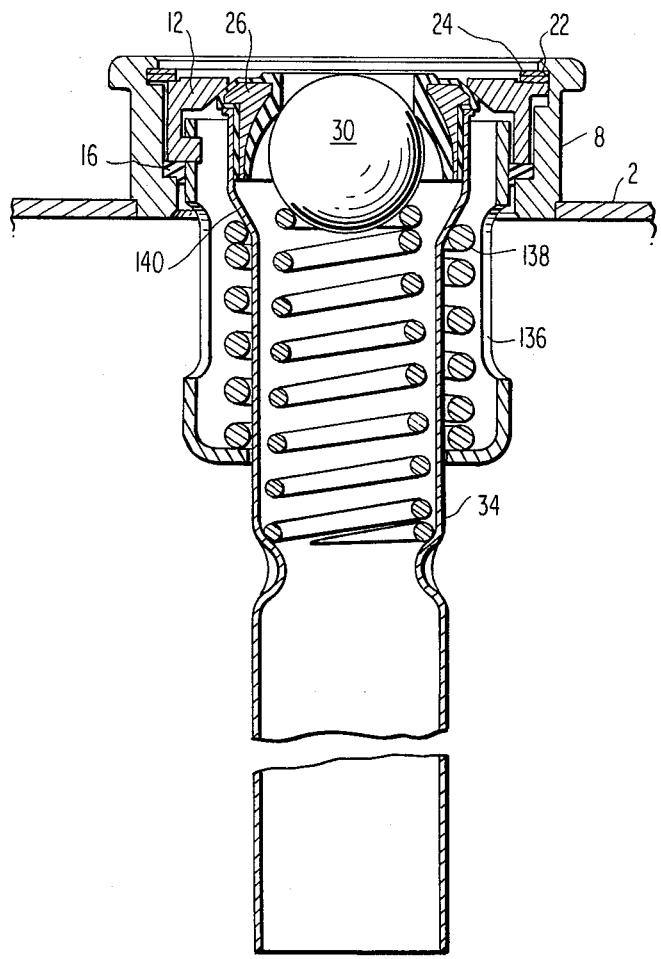
FIG. 9 is a side elevational sectional view of another embodiment of the fluid dispensing assembly in accordance with the present invention.

Another embodiment of the valve and neck assembly of the present invention is illustrated in FIG. 9. In accordance with this embodiment, in place of the employment of spring 58 for biasing the siphon tube in an upward direction, a different biasing mechanism is employed. Surrounding the upper portion of siphon tube 34 is a cup 136 which is secured within the lower portion of neck 8. Within cup 136 is a helical spring 138. Spring 138 bears against upper portion 140 of the outside of siphon tube 34. Spring 138 applies a force against surface 140 for biasing the siphon tube upwardly into a closed position. The force of spring 138 is overcome when probe 90 of coupler 88, as described above, is extended for opening the valves of the valve assembly.

The present invention may be embodied in other specific forms without departing from the spirit or essential characteristics thereof. The present embodiments are presented merely as illustrative and not restrictive, with the scope of the invention being indicated by the attached claims rather than the foregoing description. All changes which come within the meaning and range of equivalency of the claims therefore are intended to be embraced therein.

What is claimed is:
1. A fluid dispensing assembly comprising:
a container for holding the fluid;
a valve assembly for providing access to fluid within said container and having valves therein, said valve assembly having a body portion with a seal engaging surface;

valve assembly receiving means for securing said valve assembly to said container, said receiving means including a deformable seal member and non-threaded means for deforming said seal member between said seal engaging surface of said valve assembly and said receiving member without a need for substantial rotational movement, said non-threaded deforming means being releasably secured within said receiving means at a predetermined position relative to said valve body portion for preventing overcompression of said seal member when said seal member is in engagement with said seal engaging surface, said valve assembly being arranged within said receiving means such that the upper ends of both said valve assembly and said receiving means are substantially flush when said valves of said valve assembly are in a closed position in order to avoid the existence of a sump in the upper end of such arrangement; and a coupler including: grasping members for grasping said valve assembly receiving means around its outer peripheral edge for securing said coupler to said valve assembly receiving means; a coupler body having a side fitting extending therefrom coupled to a first passage within said coupler body; a probe member movable within said coupler body, said probe member having an end fitting connected to one end and defining a passageway therethrough in communication with said end fitting; and said probe member being movable within said coupler body between an open and a closed position whereby in said open position said coupler opens said valves of said valve assembly and connects said passages in said coupler to said open valves and in said closed position said coupler closes said valves of said valve assembly.

2. An assembly according to claim 1 wherein said receiving means includes a substantially cylindrical neck member that is secured to said container, said neck member has a plurality of separate flanges extending in a circumferential direction around the outer peripheral surface of said neck member and said coupler includes means for releasably securing said coupler to said neck member, said securing means including a plurality of engagement members extending from the bottom of said coupler for gripping corresponding said flanges so as to secure said coupler to said neck member.

3. An assembly according to claim 2 wherein there are three of said flanges equidistantly positioned around said outer peripheral surface of said neck member with each of said flanges being sufficiently spaced from each other for enabling said engagement members to pass through the spaces between said flanges, whereby after said engagement members pass through said spaces between said flanges, said coupler is rotated so that said engagement members grip said flanges.

4. An assembly according to claim 3 wherein each of said flanges is wedge shaped and has a stop member at one end for limiting the rotational movement of said coupler.

5. An assembly according to claim 4 further comprising means for preventing said coupler from being disengaged from said neck member when said probe is in its open position.

6. An assembly according to claim 5 further comprising actuating means for moving said probe from its open position to its closed position.

7. An assembly according to claim 6 wherein said actuating means includes a lever assembly pivotally secured to said coupler body about a pivot axis, said lever assembly having engaging means for engaging said probe member, whereby pivoting of said lever assembly about said pivot axis moves said probe between its open position and closed position.

8. An assembly according to claim 7 further comprising a handle member connected to said lever assembly and serving to move said lever assembly for moving said probe between its open position and its closed position.

9. An assembly according to claim 8 wherein said means for preventing disengagement of said coupler includes an elongated member attached to said lever assembly and being arranged so as to extend into said space between said flanges when said lever assembly is pivoted into a position for moving said probe into its open position.

10. An assembly according to claim 4 further comprising alignment means for assuring that said coupler is properly mounted or said neck member before enabling said probe to be moved into its open position.

11. An assembly according to claim 10 wherein said alignment means also prevents said coupler from being disengaged from said neck member when said probe is in its open position.

12. A fluid container comprising: walls forming a substantially closed container capable of holding pressurized fluid; valve assembly means having a plurality of valves, said valve assembly having a body portion with a seal engaging surface; valve receiving means mounted within one of said walls of said container for holding said valve assembly for pressurizing fluid contained in said container and operating with said valve assembly to deliver fluid under pressure to a tapping mechanism attached to said valve assembly; the upper portion of said body portion of said valve assembly being arranged within said valve receiving member such that its upper portion is substantially flush with the upper portion of said valve receiving member; and means for securing said valve assembly to said container including a deformable sealing member, and non-threaded means for deforming said sealing member between said seal engaging surface of said valve assembly and said receiving member without a need for substantial rotational movement, said non-threaded deforming means being releasably secured within said receiving means at a predetermined position relative to said valve body portion for preventing overcompression of said seal member when said seal member is in engagement with said seal engaging surface.

13. An assembly according to claim 1 or 12 further comprising means for maintaining said valve assembly within said receiving means and compressing said sealing member between said seal engaging surface and said receiving member to effect a seal between said valve assembly and said receiving means, said means for maintaining said valve assembly within said receiving means and said means for deforming said sealing member including a retaining member releasably secured to said receiving means and cooperating with said receiving means and said valve assembly to maintain said valve assembly in a predetermined position so that said seal engaging surface will deform said sealing member against said receiving means until said retaining member is released.

14. An assembly according to claim 12 wherein said retaining member is releasably secured within said receiving means; said receiving means includes a neck member having a top portion and a bottom portion, said top portion having said means for receiving said retaining member and said bottom portion defining said seal engaging surface and said neck member having an inner surface; and said retaining member includes a resilient member cooperating with said inner surface above the top portion of said valve body portion, and when said retaining member is engaged within said inner surface, the top portion of said valve body portion also engages said resilient member to hold said valve body portion in place.

15. An assembly according to claim 14 wherein said inner surface defines a groove extending at least substantially around the entire periphery of said inner surface adjacent the top portion of said receiving member and said resilient member is an expandable ring which expands into said groove leaving a portion exposed for engaging the top portion of said valve body portion.

16. An assembly according to claim 15 further comprising safety means for retaining said valve assembly within said valve receiving member when said container is under pressure should said retaining member become disengaged, said safety means includes an offset keyway, a key carried by said valve body, said key engaging said keyway to prevent withdrawal of said valve assembly until rotated to a predetermined position after said retaining ring has been withdrawn.

17. An assembly according to claim 16 wherein said groove defines an upper lip and a lower lip, said keyway includes a first portion extending downwardly through said upper lip but bound by said lower lip and a second portion offset circumferentially from said first portion and extending upwardly through said lower lip but bound by said upper lip of said groove whereby said groove connects said first portion to said second portion and said key carried by said valve body can only move from said first portion to the second portion through the said groove.

18. An assembly according to claim 1 or 12 wherein said valve assembly includes a siphon tube extending therefrom towards a lower portion of said container, said valve assembly includes first and second valves, the first valve having a first valve seat formed within said valve body and a first valve member for movement towards and away from said valve seat, said second valve having a second valve seat and a second valve member mounted for movement toward and away from said second valve seat; said siphon tube having a top portion and a bottom portion said first valve member being carried by said top portion of said siphon tube; and biasing means for biasing both said first valve member and said second valve member into their respectively closed positions against said first valve seat and said second valve seat.

19. An assembly according to claim 8 wherein: said valve assembly further includes a cup member cylindrically surrounding said siphon tube, said cup member having its top portion coupled to said receiving member and extending downwardly into said container; and said biasing means includes first biasing means arranged within said cup member for biasing said siphon tube along with said first valve member into its closed position and said biasing means further includes a second biasing means for biasing said second valve member against said second valve seat.

20. An assembly according to claim 18 wherein said biasing means includes first biasing means engaging both said bottom portion of said siphon tube and said container for biasing said siphon tube so that said top portion of said siphon tube with said first valve member is biased against said first valve seat for maintaining said first valve in a normally closed position.

21. An assembly according to claim 20 wherein said first biasing means includes a spring means having one end engaging the bottom portion of said siphon tube and another end for engaging the bottom of said container.

22. An assembly according to claim 21 wherein said spring means extends sufficiently beyond said bottom portion of said siphon tube so that it is under compression when said valve assembly is secured within said receiving member.

23. An assembly according to claim 22 wherein said spring means is a helical spring carried by said bottom portion of said siphon tube.

24. An assembly according to claim 23 wherein said bottom portion of said siphon tube includes an interior surface and an exterior surface, said interior surface having extensions extending therefrom for engagement with said helical spring so as to bias said siphon tube and said first valve member against said first valve seat.

25. An assembly according to claim 24 wherein said helical spring is force fitted against the inner surface of said bottom portion of said siphon tube adjacent said extensions for maintaining said spring in place within said siphon tube.

26. A fluid container capable of receiving a valve assembly having a plurality of valves and a valve body with a complementary seal engaging surface and a retaining member engaging surface comprising:

walls forming a substantially closed container capable of holding pressurized fluid; and a valve receiving assembly mounted in one of said walls of said container for holding a valve assembly for enabling fluid contained in said container to be pressurized and enabling such valve assembly to deliver fluid under pressure to a tapping mechanism attached to the valve assembly;

said valve receiving assembly including: a neck member configured to receive the valve assembly, said neck member including an upper portion and a lower portion; said lower portion of said neck member has a seal engaging surface; said neck member has a plurality of flanges positioned around its outer peripheral surface and each of said flanges is wedge shaped and at least one of said flanges has a stop member at one end for limiting the movement of a coupler when attached to said neck member and one of said flanges has a blocking portion serving to engage with a locking member of a coupler for preventing release of such coupler when such coupler is in the open position; and said upper portion of said neck member has receiving means for receiving a resilient retaining member;

said neck member being able to hold the valve assembly such that the upper portion of the valve assembly is substantially flush with the upper portion of said neck member when the valve assembly is closed and said receiving means being located for receiving a retaining member in engageable relationship with the retaining member engaging surface of the valve body for maintaining the complementary seal engaging surface a predetermined distance from said seal engaging surface of said neck member and compressing a sealing member between said seal engaging surface and the complementary seal engaging surface to effect a seal between the valve assembly and said neck member.

27. An assembly according to claim 26 wherein said receiving means for receiving a resilient retaining member includes at least a portion of a groove.

28. An assembly according to claim 27 wherein said neck member defines an inner surface which is substantially cylindrical in configuration and said groove extends entirely around said cylindrical inner surface for receiving said resilient ring.

29. An assembly according to claim 28 wherein said seal engaging surface of said lower portion includes a lip extending radially inwardly from said inner surface and entirely around the periphery of said inner surface for engaging a deformable O-ring sealing member.

30. An assembly according to claim 29 further comprising a keyway for engaging a key carried by said valve assembly.

31. A valve sealing arrangement for use with a fluid container, said arrangement comprising: a valve assembly for providing access to fluid within the container and having two valves therein, said valve assembly having a body portion with a seal engaging surface; and valve assembly receiving means for securing said valve assembly to the container, said receiving means including a deformable sealing member and non-threaded means for deforming said sealing member between said seal engaging surface of said valve assembly and said receiving member without a need for substantial rotational movement, said non-threaded deforming means being releasably secured within said receiving means at a predetermined position relative to said valve body portion for preventing overcompression of said sealing member when said sealing member is in engagement with said seal engaging surface said valve assembly being arranged within said receiving means such that the upper ends of both said valve assembly and said receiving means are substantially flush when said valves of said valve assembly are in a closed position.

32. An arrangement according to claim 31 further comprising means for maintaining said valve assembly within said receiving means and compressing said sealing member between said seal engaging surface and said receiving member to effect a seal between said valve assembly and said receiving means, said means for maintaining said valve assembly within said receiving means and said means for deforming said sealing member including a retaining member releasably secured to said receiving means and cooperating with said receiving means and said valve assembly to maintain said valve assembly in a predetermined position so that said seal engaging surface will deform said sealing member against said receiving means until said retaining member is released.

33. An arrangement according to claim 32 wherein said receiving means includes a neck member having a top portion and a bottom portion, said top portion having said means for receiving said retaining member and said bottom portion defining said seal engaging surface and said neck member having an inner surface; and said retaining member includes a resilient member cooperating with said inner surface above the top portion of said valve body portion, and when said retaining member is engaged within said inner surface, the top portion of said valve body portion also engages said resilient member to hold said valve body portion in place.

34. An arrangement according to claim 33 wherein said inner surface defines a groove extending at least substantially around the entire periphery of said inner surface adjacent the top portion of said receiving member and said resilient member is an expandable ring which expands into said groove leaving a portion exposed for engaging the top portion of said valve body portion.

35. An arrangement according to claim 34 further comprising safety means for retaining said valve assembly within said valve receiving member when said container is under pressure should said retaining member become disengaged, said safety means includes an offset keyway, a key carried by said valve body, said key engaging said keyway to prevent withdrawal of said valve assembly until rotated to a predetermined position after said retaining ring has been withdrawn.

36. An arrangement according to claim 35 wherein said groove defines an upper lip and a lower lip, said keyway includes a first portion extending downwardly through said upper lip but bound by said lower lip and a second portion offset circumferentially from said first portion and extending upwardly through said lower lip but bound by said upper lip of said groove whereby said groove connects said first portion to said second portion and said key carried by said valve body can only move from said first portion to the second portion through said groove.

37. An arrangement according to claim 31 wherein said valve assembly includes a siphon tube extending therefrom towards a lower portion of the container, said valve assembly includes first and second valves, said first valve having a first valve seat formed within said valve body and a first valve member for movement towards and away from said valve seat, said second valve having a second valve seat and a second valve member mounted for movement toward and away from said second valve seat; said siphon tube having a top portion and a bottom portion, said first valve member being carried by said top portion of said siphon tube; and biasing means for biasing both said first valve member and said second valve member into their respectively closed positions against said first valve seat and said second valve seat.

38. An arrangement according to claim 37 wherein: said valve assembly further includes a cup member cylindrically surrounding said siphon tube, said cup member having its top portion coupled to said receiving member and extending downwardly into said container; and said biasing means includes first biasing means arranged within said cup member for biasing said siphon tube along with said first valve member into its closed position and said biasing means further includes a second biasing means for biasing said second valve member against said second valve seat.

39. An arrangement according to claim 37 wherein said biasing means includes first biasing means engaging both said bottom portion of said siphon tube and the container for biasing said siphon tube so that said top portion of said siphon tube with said first valve member is biased against said first valve seat for maintaining said first valve in a normally closed position.

40. An arrangement according to claim 39 wherein said first biasing means includes a spring means having one end engaging the bottom portion of said siphon tube and another end for engaging the bottom of the container.

41. An arrangement according to claim 40 wherein said spring means extends sufficiently beyond said bottom portion of said siphon tube so that it is under compression when said valve assembly is secured within said receiving member.

42. An arrangement according to claim 41 wherein said spring means is a helical spring carried by said bottom portion of said siphon tube.

43. An arrangement according to claim 42 wherein said bottom portion of said siphon tube includes an interior surface and an exterior surface, said interior surface having extensions extending therefrom for engagement with said helical spring so as to bias said siphon tube and said first valve member against said first valve seat.

44. An assembly according to claim 43 wherein said helical spring is force fitted against the inner surface of said bottom portion of said siphon tube adjacent said extensions for maintaining said spring in place within said siphon tube.

45. A coupler assembly for coupling a fluid dispensing mechanism to a valve assembly mounted within a neck member of a fluid container, where the neck member is substantially cylindrical and has a plurality of separate flanges extending in a circumferential direction around the outer peripheral surface of the neck member, each of the flanges has a stop member at one end thereof and the valve assembly includes two valves, said coupler assembly comprising: a coupler body having a side fitting coupled to a first passageway within said coupler body and a top fitting coupled to a second passageway within said coupler body; a probe member movable within said coupler body, said probe member being coupled to said top fitting and having a passageway therethrough in communication with said second passageway; actuating means for moving said probe member between an open position and a closed position whereby in said open position said coupler opens the valves of the valve assembly and connects all of said passageways within said coupler body to the open valves and in said closed position said coupler seals said passageways of the valves of the valve assembly; means for releasably securing said coupler body to the neck member, said securing means including a plurality of engagement members extending from the bottom of said coupler for gripping corresponding flanges so as to secure said coupler body to the neck member, said securing means enabling said coupler body to be rotated on the neck member with such rotational movement being limited by the stop members on the flanges; and, locking means for preventing said coupler from being disengaged from the neck member when said probe is in said open position, said locking means including a locking member movable into a position for engaging one of the flanges of the neck member for preventing any attempted rotational movement of said coupler.

46. An assembly according to claim 45 where the neck member has three flanges equidistantly spaced around its outer peripheral surface and each of the flanges is sufficiently spaced from each other for enabling said engagment members to pass through the spaces between the flanges, wherein when securing said coupler body to the neck member said engagement members pass through the spaces between the flanges and then said coupler body is rotated so that said engagement members grip the flanges.

47. An assembly according to claim 46 wherein said actuating means includes a lever assembly pivotally secured to said coupler body about a pivot axis, said lever assembly having engaging means for engaging said probe member, whereby pivoting of said lever assembly about said pivot axis moves said probe between said open position and said closed position.

48. An assembly according to claim 47 further comprising a handle member connected to said lever assembly and serving to move said lever assembly for moving said probe between said open position and said closed position.

49. An assembly according to claim 48 wherein said means for preventing disengagement of said coupler includes an elongated member attached to said lever assembly so as to extend into said space between the flanges when said lever assembly is pivoted into a position for moving said probe into said open position.

* * * * *

UNITED STATES PATENT AND TRADEMARK OFFICE
CERTIFICATE OF CORRECTION

PATENT NO. : 4,305,421
DATED : December 15, 1981
INVENTOR(S) : Merton R. Fallon

It is certified that error appears in the above-identified patent and that said Letters Patent is hereby corrected as shown below:

Claim 14, column 13, line 3, change "12" to --13--.

Claim 19, column 13, line 60, change "8" to --18--.

Signed and Sealed this

Nineteenth Day of April 1983

[SEAL]

Attest:

GERALD J. MOSSINGHOFF

Attesting Officer

Commissioner of Patents and Trademarks